(12) United States Patent
Garcia et al.

(10) Patent No.: US 12,544,268 B2
(45) Date of Patent: Feb. 10, 2026

(54) PATIENT INTERFACE DEVICE FOR OPHTHALMIC SURGICAL LASER SYSTEM

(71) Applicant: AMO DEVELOPMENT, LLC, Irvine, CA (US)

(72) Inventors: Jose Garcia, Fremont, CA (US); Trevor Hannon, Hayward, CA (US); Vyechi Low, San Jose, CA (US); Christina Lagarto, Sunnyvale, CA (US)

(73) Assignee: AMO DEVELOPMENT, LLC, Irvine, CA (US)

( * ) Notice: Subject to any disclaimer, the term of this patent is extended or adjusted under 35 U.S.C. 154(b) by 848 days.

(21) Appl. No.: 17/663,198

(22) Filed: May 12, 2022

(65) Prior Publication Data

US 2022/0362054 A1 Nov. 17, 2022

Related U.S. Application Data

(60) Provisional application No. 63/189,038, filed on May 14, 2021.

(51) Int. Cl.
*A61F 9/009* (2006.01)

(52) U.S. Cl.
CPC .................... *A61F 9/009* (2013.01)

(58) Field of Classification Search
CPC ....................................................... A61F 9/009
See application file for complete search history.

(56) References Cited

U.S. PATENT DOCUMENTS

| 5,026,352 | A | * | 6/1991 | Anderson | ............. | A61M 25/02 |
| | | | | | | 604/174 |
| 5,125,915 | A | * | 6/1992 | Berry | ................ | A61M 39/0613 |
| | | | | | | 604/533 |
| 5,382,239 | A | * | 1/1995 | Orr | ........................ | A61M 25/02 |
| | | | | | | 604/177 |
| 6,863,667 | B2 | | 3/2005 | Webb et al. | | |
| 8,858,581 | B2 | | 10/2014 | Robl et al. | | |
| 8,939,967 | B2 | | 1/2015 | Raksi | | |
| 9,849,037 | B2 | | 12/2017 | Rathjen et al. | | |

(Continued)

FOREIGN PATENT DOCUMENTS

AU 2010361364 A1 4/2013
FR 2947166 B1 11/2011

(Continued)

*Primary Examiner* — Erin Mcgrath

(57) ABSTRACT

A patient interface device for an ophthalmic surgical laser system includes a lens cone component for coupling to the laser system and a suction ring component having a flexible skirt for coupling to the patient's eye. The suction ring component includes a gripper integrated with the flexible skirt, formed of hard plastic material and having two jaws that face each other to define a receiving opening between them. During use, a base portion of the lens cone is inserted into the receiving opening of the gripper and retained by the clamping force of the jaws. To ensure that the gripper securely retains the lens cone, a soft thermoplastic elastomer material is provided on the outer surface of the base portion of the lens cone, and the inner surfaces of the jaws of the gripper are provided with teeth to engage the soft thermoplastic elastomer material of the lens cone.

17 Claims, 3 Drawing Sheets

(56) References Cited

U.S. PATENT DOCUMENTS

| | | |
|---|---|---|
| 10,335,315 B2 | 7/2019 | Goldshleger et al. |
| 10,624,787 B2 | 4/2020 | Donitzky et al. |
| 10,799,394 B2 | 10/2020 | Garcia et al. |
| 10,898,382 B2 | 1/2021 | Accurso et al. |
| 10,966,864 B2 | 4/2021 | Garcia et al. |
| 2002/0103481 A1 | 8/2002 | Webb et al. |
| 2011/0190741 A1 | 8/2011 | Deisinger et al. |
| 2013/0041354 A1 | 2/2013 | Brownell et al. |
| 2013/0345682 A1 | 12/2013 | Hailmann et al. |
| 2014/0276673 A1 | 9/2014 | Heitel et al. |
| 2017/0325997 A1 | 11/2017 | Heitel |
| 2018/0036168 A1 | 2/2018 | Heitel et al. |
| 2019/0175400 A1 | 6/2019 | Loerner et al. |

FOREIGN PATENT DOCUMENTS

| | | |
|---|---|---|
| RU | 2703652 C2 | 10/2019 |
| WO | 2020048920 A1 | 3/2020 |

\* cited by examiner

PATIENT INTERFACE DEVICE FOR OPHTHALMIC SURGICAL LASER SYSTEM

CROSS REFERENCE TO RELATED APPLICATIONS

This application claims priority to U.S. Provisional Patent Application No. 63/189,038, filed on May 14, 2021, the entire contents of which are hereby incorporated by reference.

BACKGROUND OF THE INVENTION

Field of the Invention

This invention relates to ophthalmic surgical laser systems, and in particular, it relates to patient interface devices used to stabilize the patient's eye and to deliver the laser beam to the eye during ophthalmic surgery.

Description of Related Art

Significant developments in laser technology have led to its application in the field of ophthalmic surgery, and laser surgery has become the technique of choice for ophthalmic surgical applications. Ophthalmic surgery is a precision operation and requires precise coupling between the surgical tool (i.e., the laser beam) and the region to be treated (i.e., a portion of the patient's eye). Movement of the eye with respect to the intended focal point of the laser beam can lead to non-optimal results and might result in permanent damage to tissue within the eye. Given that eye movement is often the result of autonomic reflex, techniques have been developed in an attempt to stabilize the position of a patient's eye with respect to an incident laser beam.

Mechanical stabilization devices, referred to as patient interfaces (PI), have been developed for coupling the patient's eye to the laser system. A PI typically has a component that directly contacts the eye, and engages and stabilizes the eye; meanwhile, the PI is attached to the laser system, so that the laser beam can be aligned to the eye. Some conventional PIs have a two-piece structure, where the component that directly contacts the eye and the component that attaches to the laser system are separate components held together by a gripping or clamping device.

For example, U.S. Pat. No. 6,863,667, entitled Ocular Fixation and Stabilization Device for Ophthalmic Surgical Applications, describes a patient interface device which includes "an attachment ring which overlays the anterior surface of the eye. A lens cone defines a first plane surface and is coupled to a delivery tip of the surgical laser such that the delivery tip is positionally referenced to the first plane surface. A gripper, includes a first receptacle for receiving the attachment ring, and further includes a central orifice for receiving the lens cone. The gripper stabilizes the relative positions of the lens cone and the attachment ring when the cone and ring are received within the gripper. In particular, the lens cone includes an apex ring coupled to the first plane surface. An applanation lens is disposed at a distal end of the apex ring, and is positioned in a second plane, parallel to the first plane such that the delivery tip is positionally referenced to the second plane. The applanation lens further includes an anterior surface and an applanation surface configured to contact the eye and applanate the anterior surface of the eye upon application of a pressure. The applanation surface defines the second plane, such that the delivery tip is positionally referenced to the applanation surface and thereby to the applanated surface of the eye." (Col. 3, lines 44-64.)

U.S. Pat. Appl. Pub. No. 2013/0345682, entitled Corneal Contact System, describes: "An interface device for selectively engaging a suction ring with a patient interface of a laser unit includes an annular shaped base member that is formed with an orifice. The suction ring is affixed against one side of the base member to surround the orifice. A grip is mounted on the other side of the base member. Structurally, the grip includes independently manipulated handles that can be operated to symmetrically apply equal and opposite forces against the patient interface of the laser unit during an engagement of the device with the patient interface. With this engagement, the base member and the suction ring are held on the patient interface of the laser unit." (Abstract.)

U.S. Pat. Appl. Pub. No. 2017/0325997, entitled Ophthalmic Interface Apparatus, Method of Interfacing a Surgical Laser with an Eye, and Support Ring for Use with a Suction Ring, describes a patient interface device, shown in its FIG. 3, which includes a lens cone for establishing optical path alignment and an attachment ring for attaching to the eye. The surfaces of the mating interfaces between the cone and the attachment ring are "splined . . . , similar to a bevel gear with fine teeth, that would provide rotational locking and lateral fixation when the patient interface is docked to the patient's eye." (Para. [0045].) This device does not use a gripper to attach the lens cone to the attachment ring (para. [0046]).

SUMMARY

The present invention is directed to a patient interface device for an ophthalmic surgical laser system that substantially obviates one or more of the problems due to limitations and disadvantages of the related art.

An object of the present invention is to provide a patient interface device with enhanced engagement between the lens cone which is coupled to the laser delivery head and the suction ring which is coupled to the patient's eye.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a patient interface device for coupling a patient's eye to an ophthalmic surgical laser system, which includes: a lens cone configured to be coupled to the ophthalmic surgical laser system, and a suction ring configured to be coupled to the patient's eye. The lens cone includes a shell formed of a rigid material; and a soft thermoplastic elastomer material formed on an outside surface of a portion of the shell to form a base portion of the lens cone. The suction ring includes: a gripper including two jaws facing each other to define a receiving opening between them, the gripper being deformable to open the two jaws relative to each other to receive the base portion of the lens cone in the receiving opening, wherein inner surfaces of the two jaws have a plurality of protrusions and recesses; and a ring shaped flexible skirt joined to the gripper and concentric with the receiving opening, and configured to be coupled to the patient's eye.

In some embodiments, the soft thermoplastic elastomer material has a durometer hardness of 35 to 70 Shore A.

In some embodiments, the shell includes a frustoconical portion and a cylindrical portion, and wherein the soft thermoplastic elastomer material is formed on an outside surface of the cylindrical portion. The soft thermoplastic elastomer material includes a cylindrical shaped first portion formed on the outside surface of the cylindrical portion of the shell, and a ring shaped second portion which is located below a lower edge of the shell and which extends inwardly in a lateral direction from a bottom end of the first portion to form a circular center opening, and the lens cone further includes a lens retained in the center opening.

In some embodiments, the soft thermoplastic elastomer material including the first portion and the second portion is formed as one piece by overmolding onto the shell.

In some embodiments, the gripper includes two lever handles joined to each other at their mid-sections, wherein distal ends of the two lever handles form the two jaws respectively, wherein the gripper is deformed to open the two jaws relative to each other when proximal ends of the two lever handles are pressed toward each other.

In another aspect, the present invention provides a patient interface device for coupling a patient's eye to an ophthalmic surgical laser system, which includes: a lens cone configured to be coupled to the ophthalmic surgical laser system, and a suction ring configured to be coupled to the patient's eye. The lens cone includes: a shell formed of a rigid material, having a frustoconical portion and a cylindrical portion; a soft thermoplastic elastomer material formed on an outside surface of the cylindrical portion of the shell to form a base portion of the lens cone; and a lens located near the base portion and held in a center opening of the soft thermoplastic elastomer material. The suction ring includes: a gripper formed of a hard and deformable plastic material, the gripper including two lever handles joined to each other at their mid-sections, wherein distal ends of the two lever handles form two jaws respectively, the two jaws facing each other to define a receiving opening between them which is configured to receive the base portion of the lens cone, wherein inner surfaces of the two jaws have a plurality of protrusions and recesses; and a ring shaped flexible skirt joined to the gripper and concentric with the receiving opening of the gripper, wherein the flexible skirt is formed of a compliant natural or synthetic polymer and has a circular inner edge and a circular outer edge.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
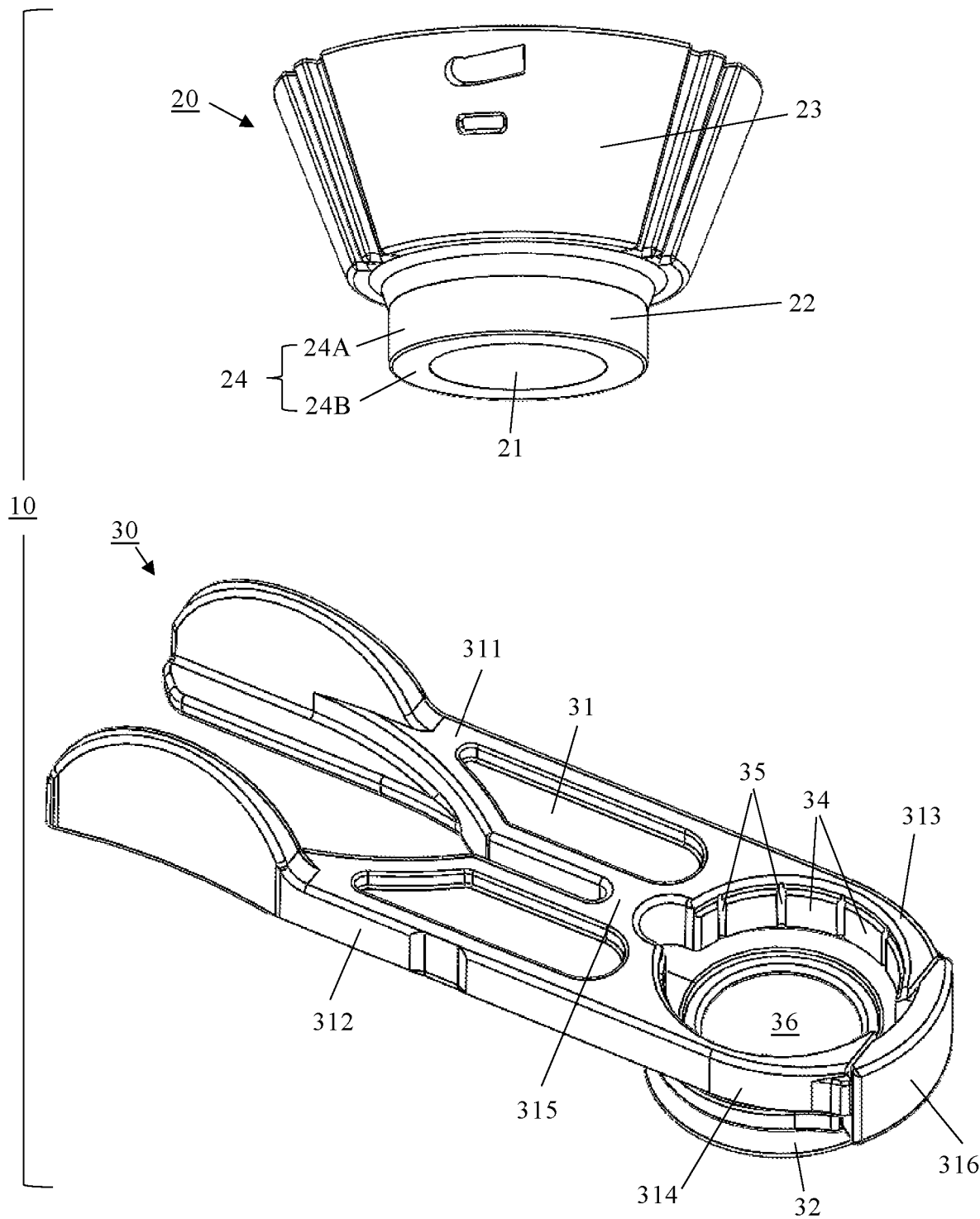
FIG. 1 is a perspective view illustrating a patient interface device which includes a lens cone and a suction ring according to an embodiment of the present invention.

Embodiments of the present invention provide a patient interface device used to stabilize the patient's eye and to deliver the laser beam to the eye during ophthalmic surgery. As illustrated in FIG. 1, the patient interface device 10 includes two separate components, namely, a lens cone 20 having a lens 21, and a suction ring 30 which includes a gripper 31 and a ring shaped flexible skirt 32 integrated as one piece. The lens cone 20 is configured to be attached to the laser delivery head of the laser system (not shown) during surgery. The suction ring 30 is configured to be coupled to the patient's eye, via the flexible skirt 32, by a vacuum force applied to a channel formed by the flexible skirt and the eye surface. The gripper 31 of the suction ring is configured to receive a base portion 22 of the lens cone 20 in a receiving opening 36 of the suction ring 30 which is concentric with the flexible skirt 32, and to securely retain the base portion by a clamping force. The partial cut-away view in FIG. 2 shows the mating location between the lens cone base portion 22 and the gripper 31.

Preferably, the lens 21 is located near the bottom end of the base portion of the lens cone 20, and contacts the eye when the suction ring 30 is coupled to the patient's eye and the lens cone base portion 22 is inserted into and retained by the gripper 31.

Figure 4:
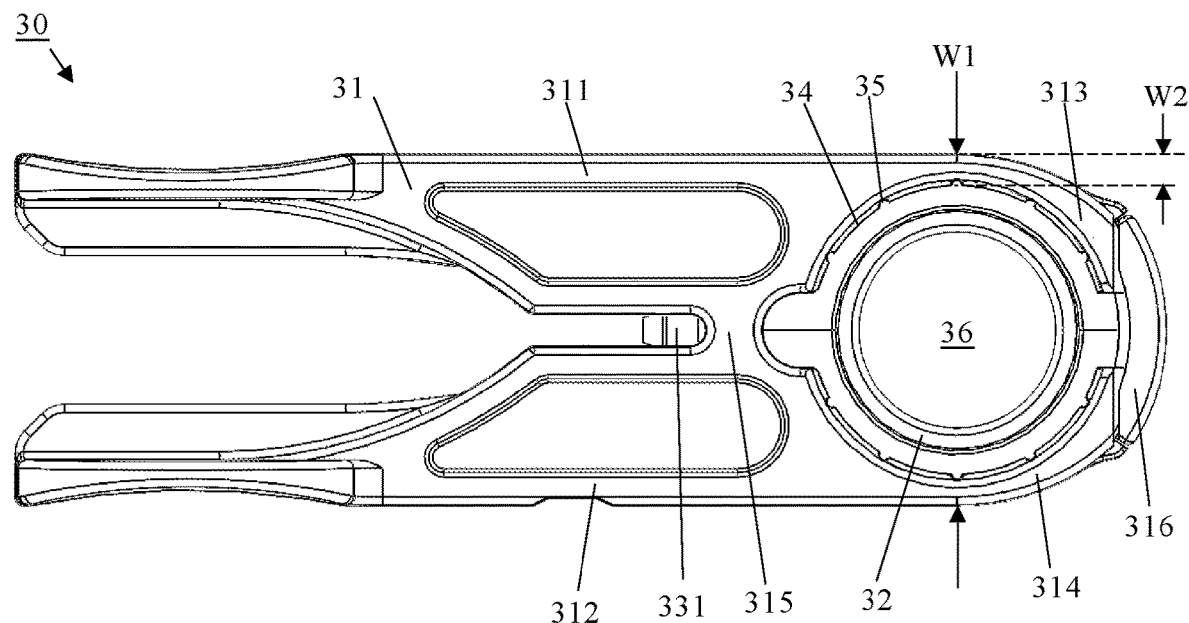
FIG. 4 is a top plan view of the suction ring in the embodiment of FIG. 1.

As illustrated in FIG. 1 and FIG. 4, the gripper 31 is constructed like a clip or clothes pin, formed by two lever handles 311 and 312 having respective jaws 313 and 314 at their distal ends, the handles being jointed to each other at a point 315 located at their mid-sections. The two jaws 313 and 314 face each other to define the substantially circular shaped receiving opening 36 between them. The lever handles 311 and 312 including the jaws are formed of a hard but slightly deformable material, such as a hard plastic, for example, polycarbonate. When the lever handles 311 and 312 are squeezed toward each other at their proximal ends (the ends held by the surgeon's hand, opposite the jaws), a deforming force causes the two jaws 313 and 314 to open relative to each other. As a result, the receiving opening 36 widens, so that the lens cone base portion 22 may be inserted into the receiving opening. When the squeezing of the lever handles 311 and 312 is relaxed, the jaws 313 and 314 close toward their undeformed positions, so that they compress against the lens cone base portion 22 to retain it in the receiving opening 36. The gripper 31 optionally includes a lock member 316, which is shaped to engage the two jaws 313 and 314 at their distal points and functions to prevent the jaws from opening after the lens cone base portion 22 is inserted.

Figure 2:
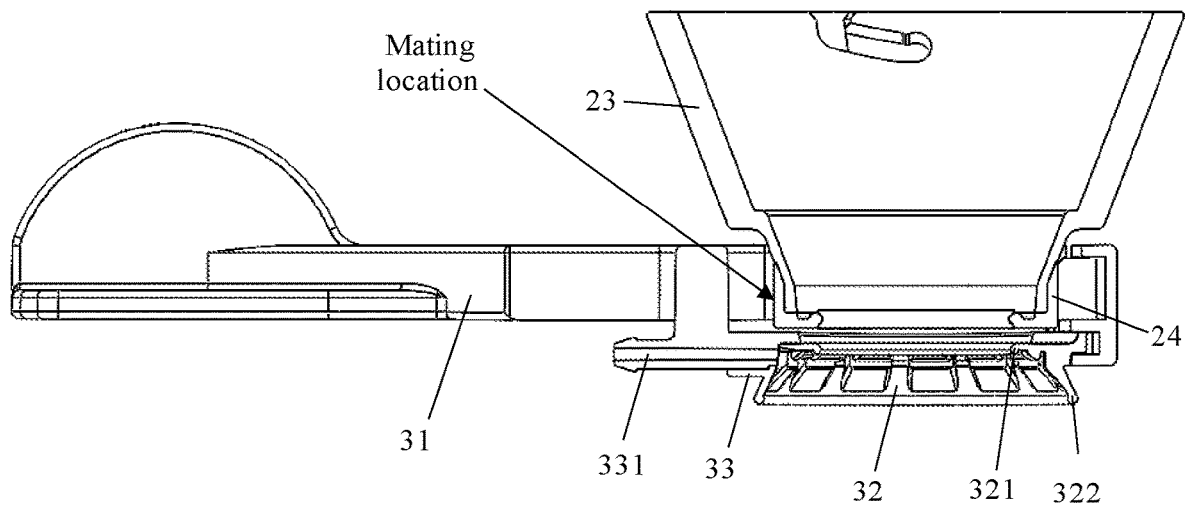
FIG. 2 is a partial cut-away view illustrating the lens cone held by a gripper of the suction ring in the embodiment of FIG. 1.

As illustrated in FIG. 2, the flexible skirt 32 defines inner and outer circular edges 321 and 322, which form a circular channel with the surface of the eye when the flexible skirt is placed on the eye. The flexible skirt 32 is supported by a ring shaped connecting member 33, which is substantially concentric with the opening 36 and joined to the lever handles 311 and 312 near the mid-sections of the handles. The connecting member 33 may also include a vacuum port 331 that is connected to the flexible skirt 32 to apply a vacuum as described earlier. Note that the connecting member 33 is not connected to the jaws, so as not to interfere with the opening and closing of the jaws. The flexible skirt is preferably formed of a compliant natural or synthetic polymer, such as silicone, flexible plastic, rubber, etc., and may be overmolded onto the ring shaped portion of the connecting member 33.

In practice, it is crucial that the two components of the patient interface device, namely the lens cone 20 and the suction ring 30, mate securely and that any movements between the two components be minimized. If the two components were to slip relative to each other, there is a risk of misplaced laser beam positions with respect to the eye and consequently, potentially incorrect treatment and/or damage to the eye by the laser beam. In embodiments of the present invention, to ensure that the gripper 31 securely retains the lens cone 20, a soft thermoplastic elastomer (TPE) material 24 is provided on the outer surface of the base portion 22 of the lens cone, and the inner surfaces of the jaws 313 and 314 of the gripper 31 are provided with teeth 34 to engage the soft TPE material of the lens cone.

Figure 3:
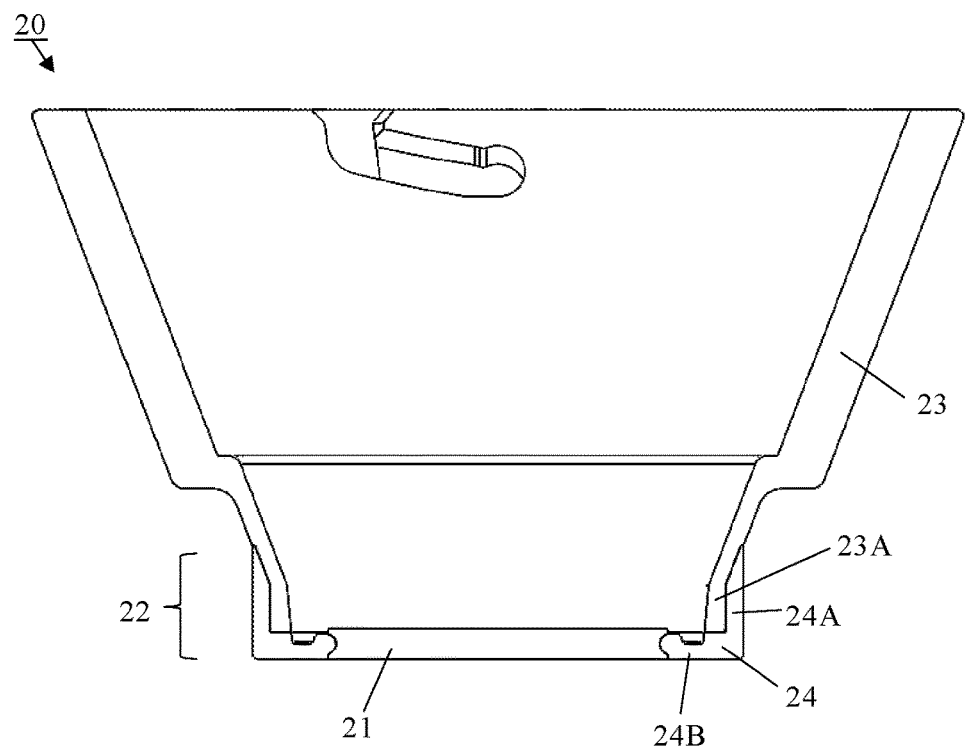
FIG. 3 is a cut-away view of the lens cone in the embodiment of FIG. 1.

As illustrated in FIG. 1 and the cut-away view of the lens cone in FIG. 3, the lens cone 20 is formed of a generally frustoconical shaped shell 23 made of a rigid material, for example, metal or a hard plastic such as polycarbonate, with a piece of soft TPE material 24 provided as a part of the base portion 22 of the lens cone. The soft TPE piece 24 includes a cylindrical shaped first portion 24A that extends in a axial direction of the lens cone and surrounds the approximately cylindrical shaped base portion 23A of the shell, and a ring shaped second portion 24B which is located just below the lower edge of the shell, and which extends inwardly in a lateral direction from the bottom end of the first portion 24A. The second portion 24B defines a circular center opening, and the lens 21 is held in the center opening by the second portion 24B. The soft TPE material 24B allows the lens 21 to move slightly in the axial direction of the lens cone, which facilitates the coupling of the patient interface device to the eye. In the illustrated embodiment, the lens 21 has a circular groove around its outer edge, and the inner edge of the second portion 24B of the soft TPE piece extends into the groove to hold the lens. The thickness of the first portion 24A is preferably between 0.03 mm and 2 mm, and the thickness of the second portion 24B is preferably between 0.1 mm and 1.0 mm.

The entire soft TPE piece 24 is preferably formed as one piece, for example, by molding. In a preferred embodiment, the soft TPE piece 24 is overmolded directly on the base portion 23A of the lens cone shell. Thus, only one overmolding step is required, and the soft TPE piece 24 performs both the function of holding the lens 21 and the function of providing a more secure engagement with the gripper 31. Such direct overmolding of the TPE material 24 allows reduction of manufacturing time and error.

Preferably, the soft TPE material 24 has a durometer hardness of 25 to 90 Shore A, and more preferably, 35 to 70 Shore A. TPE materials in the preferred hardness range provide best engagement between the lens cone 20 and the gripper 31. In one particular example, the soft TPE material is Versaflex™ OM 1040X-1, commercially available from Avient™, which has a durometer hardness of 42 Shore A. Many other suitable TPE materials may be used.

As illustrated in FIG. 1, the teeth 34 on the inside surfaces of the jaws 313 and 314 (i.e. the inner surface of the receiving opening 36) of the gripper 31 are a plurality of protrusions separated by a plurality of recesses 35, e.g. grooves extending in the axial direction (the direction along the central axis of the receiving opening 36), distributed in the circumferential direction around the opening. In preferred embodiments, the teeth 34 are formed integrally with, and from the same material as, the rest of the handles 311 and 312, for example, formed of polycarbonate by molding.

When the gripper 31 is in the natural, undeformed state, the inner diameter of the receiving opening 36, as defined by the surface of the teeth 34, is slightly smaller than the outer diameter of the first portion 24A of the soft TPE piece of the lens cone 20, for example, by at least 0.1 mm, or preferably, by approximately 0.2 to 0.6 mm, or more preferably, by approximately 0.3 mm. Because the TPE material is soft and will deform when engaged by the relatively hard teeth 34, the grooves 35 can accommodate the deformed TPE material. In other words, when the lens cone base portion 22 is inserted in the receiving opening 36 and the gripper 31 is closed, the teeth 34 bite into the soft TPE material 24A, creating a strong engagement between the gripper and the lens cone, which reduces slippage and increases the amount of torque needed to move the components.

In one embodiment, the depth of the recesses 35, i.e. the radial distance from the surface of the teeth 34 to the bottom of the recesses, is approximately 0.2 to 0.5 mm, e.g., approximately 0.4 mm; the angular width of the teeth is approximately 22.0 to 26.0 degrees, e.g., approximately 25.0 degrees, and the angular width of the grooves is approximately 4.0 to 8.0 degrees, e.g., approximately 5.0 degrees. Other suitable geometries of the teeth 34 and recesses 35 may be used. Moreover, the preferred angular widths of the teeth and the recesses may depend on the hardness of the TPE material.

In the illustrated embodiment, the surfaces of the protruding teeth 34 are smooth. In alternative embodiments, the surfaces of the teeth 34 may be textured to further increase friction and enhance the engagement with the TPE material. In other alternative embodiments, in lieu of the alternating teeth 34 and grooves 35, the inner surface of the jaws 313 and 314 is an uneven or textured surface including multiple protrusions (protruding areas) and recesses (recessed areas) arranged in any suitable pattern. Here, it should be understood that the "protrusions" and "recesses" are relative to each other.

The use of the TPE material 24 on the lens cone base portion 22 is a solution to a problem that the inventors encountered when designing the lens cone and suction ring components of the patient interface device. While patient interface devices that uses a lens cone and a gripper have been described, for example, in the aforementioned U.S. Pat. No. 6,863,667, different ophthalmic laser systems impose different requirements on the patient interface device intended to be used with them. In embodiments of the present invention, the lens cone 20, including its base portion 22, has certain outer diameters due to requirements of the laser system. For example, in some embodiments, the outer diameter of the base portion 23A of the lens cone shell is approximately 0.1 to 1.2 mm, for example, approximately 0.8 mm. Meanwhile, outer dimensions of the gripper 31, in particular, the width of the jaws portion of the gripper, indicated as W1 in FIG. 4, are limited by the geometry of the patient's facial structures. In some embodiments, the width W1 is limited to below approximately 30 mm.

As a result, in some embodiments of the present invention, the thickness of the jaws 313 and 314 at their narrowest point, indicated by the thickness W2 in FIG. 4, is approximately 1.5 to 2.5 mm, for example, approximately 1.93 mm; the inner diameter of the receiving opening 36 is approximately 17.0 to 20.0 mm, for example, approximately 18.5 mm; and the height of the inner surface of the jaws that engages the base portion 22 of the lens cone 20 is approximately 3.4 to 3.8 mm, for example, approximately 3.6 mm. The inventors have discovered that these physical dimensions, in particular the minimum thickness of the jaws W2, make it challenging for the jaws to provide a sufficient clamping force (hold strength) to securely retain the lens cone base portion 22 if the inner surface of the jaws is smooth and the lens cone base portion is made of the same hard material as the lens cone shell (e.g. metal, polycarbonate). To solve this problem, the teeth 34 are provided on the jaws, and the soft TPE material 24A is provided on the outer surface of the lens cone base portion 22, as described above. The TPE material is more tacky and has a greater coefficient of friction than the hard plastic material (e.g. polycarbonate) that the rest of the lens cone is made of. The provision of the TPE material and the teeth enables a more secure grip of the suction ring on the lens cone when the two are mated together.

It will be apparent to those skilled in the art that various modification and variations can be made in the patient interface device of the present invention without departing from the spirit or scope of the invention. Thus, it is intended that the present invention cover modifications and variations that come within the scope of the appended claims and their equivalents.

What is claimed is:

1. A patient interface device for coupling a patient's eye to an ophthalmic surgical laser system, comprising:
   a lens cone configured to be coupled to the ophthalmic surgical laser system, including:
      a shell formed of a rigid material, including a frusto-conical portion and a cylindrical portion;
      a soft thermoplastic elastomer material formed on an outside surface of a portion of the shell to form a base portion of the lens cone, the soft thermoplastic elastomer material including a cylindrical shaped first portion formed on the outside surface of the cylindrical portion of the shell and a ring shaped second portion which is located below a lower edge of the shell and which extends inwardly in a lateral direction from a bottom end of the first portion to form a circular center opening, the cylindrical shaped first portion and the ring shaped second portion forming an integral piece; and
      a lens retained by the ring shaped second portion of the soft thermoplastic elastomer material in the center opening thereof; and
   a suction ring configured to be coupled to the patient's eye, including:
      a gripper including two jaws facing each other to define a receiving opening between them, the gripper being deformable to open the two jaws relative to each other to receive the base portion of the lens cone in the receiving opening, wherein inner surfaces of the two jaws have a plurality of protrusions and recesses; and
      a ring shaped flexible skirt joined to the gripper and concentric with the receiving opening, and configured to be coupled to the patient's eye.

2. The patient interface device of claim 1, wherein the soft thermoplastic elastomer material has a durometer hardness of 35 to 70 Shore A.

3. The patient interface device of claim 1, wherein the soft thermoplastic elastomer material including the first portion and the second portion is formed as one piece by overmolding onto the shell.

4. The patient interface device of claim 1, wherein a thickness of the first portion of the soft thermoplastic elastomer material is between 0.03 mm and 2 mm.

5. The patient interface device of claim 1, wherein the gripper includes two lever handles joined to each other at their mid-sections, wherein distal ends of the two lever handles form the two jaws respectively, wherein the gripper is deformed to open the two jaws relative to each other when proximal ends of the two lever handles are pressed toward each other.

6. The patient interface device of claim 5, wherein the gripper further includes a ring shaped connecting member joined to the lever handles near the mid-sections of the lever handles, and wherein the flexible skirt is joined to the connecting member by overmolding.

7. The patient interface device of claim 1, wherein the flexible skirt has a circular inner edge and a circular outer edge, and is formed of a compliant natural or synthetic polymer.

8. The patient interface device of claim 1, wherein the jaws are formed integrally from a hard plastic material by molding.

9. The patient interface device of claim 1, wherein the gripper further includes a lock member configured to engage the two jaws at their distal points.

10. The patient interface device of claim 1, wherein when the gripper is in an undeformed state, an inner diameter of the receiving opening of the gripper, defined by surfaces of the protrusions of the jaws, is smaller than an outer diameter of the soft thermoplastic elastomer material of the base portion of the lens cone by 0.2 to 0.4 mm.

11. A patient interface device for coupling a patient's eye to an ophthalmic surgical laser system, comprising:
   a lens cone configured to be coupled to the ophthalmic surgical laser system, including:
      a shell formed of a rigid material, having a frustoconical portion and a cylindrical portion;
      a soft thermoplastic elastomer material formed on an outside surface of the cylindrical portion of the shell to form a base portion of the lens cone; wherein the soft thermoplastic elastomer material includes a cylindrical shaped first portion formed on the outside surface of the cylindrical portion of the shell, and a ring shaped second portion which is located below a lower edge of the shell and which extends inwardly in a lateral direction from a bottom end of the first portion to form a circular center opening, wherein the lens is retained in the center opening, and wherein the soft thermoplastic elastomer material is formed as one piece by overmolding onto the shell and
      a lens located near the base portion and held in a center opening of the soft thermoplastic elastomer material; and
   a suction ring configured to be coupled to the patient's eye, including:
      a gripper formed of a hard and deformable plastic material, the gripper including two lever handles joined to each other at their mid-sections, wherein distal ends of the two lever handles form two jaws respectively, the two jaws facing each other to define a receiving opening between them which is configured to receive the base portion of the lens cone, wherein inner surfaces of the two jaws have a plurality of protrusions and recesses; and
      a ring shaped flexible skirt joined to the gripper and concentric with the receiving opening of the gripper, wherein the flexible skirt is formed of a compliant natural or synthetic polymer and has a circular inner edge and a circular outer edge.

12. The patient interface device of claim 11, wherein the soft thermoplastic elastomer material has a durometer hardness of 35 to 70 Shore A.

13. The patient interface device of claim 11, wherein a thickness of the first portion of the soft thermoplastic elastomer material is between 0.03 mm and 2 mm.

14. The patient interface device of claim 11, wherein the gripper further includes a ring shaped connecting member joined to the lever handles near the mid-sections of the lever handles, and wherein the flexible skirt is joined to the connecting member by overmolding.

15. The patient interface device of claim 11, wherein the lever handles are formed integrally by molding.

16. The patient interface device of claim 11, wherein the gripper further includes a lock member configured to engage the two jaws at their distal points to prevent the jaws from opening.

17. The patient interface device of claim 11, wherein when the gripper is in an undeformed state, an inner diameter of the receiving opening as defined by surfaces of the protrusions on the jaws is smaller than an outer diameter of the soft thermoplastic elastomer material of the base portion of the lens cone by 0.2 to 0.4 mm.

* * * * *